(12) United States Patent
Abdallah et al.

(10) Patent No.: US 10,951,084 B2
(45) Date of Patent: Mar. 16, 2021

(54) POWER DISTRIBUTION FOR ROTARY ELECTRIC MACHINE

(71) Applicant: Hitachi Automotive Systems Americas, Inc., Harrodsburg, KY (US)

(72) Inventors: Ali Abdallah, Dearborn, MI (US); Zifu Wang, Northville, MI (US)

(73) Assignee: HITACHI AUTOMOTIVE SYSTEMS AMERICAS, INC., Harrodsburg, KY (US)

( * ) Notice: Subject to any disclaimer, the term of this patent is extended or adjusted under 35 U.S.C. 154(b) by 314 days.

(21) Appl. No.: 16/185,481

(22) Filed: Nov. 9, 2018

(65) Prior Publication Data

US 2020/0153307 A1 May 14, 2020

(51) Int. Cl.
*H02K 3/52* (2006.01)
*H02K 3/38* (2006.01)

(52) U.S. Cl.
CPC .............. *H02K 3/522* (2013.01); *H02K 3/38* (2013.01); *H02K 2203/09* (2013.01)

(58) Field of Classification Search
CPC ....... H02K 3/522; H02K 3/38; H02K 2203/09
See application file for complete search history.

(56) References Cited

U.S. PATENT DOCUMENTS

| 5,828,147 | A | * | 10/1998 | Best | H02K 3/522 310/71 |
|---|---|---|---|---|---|
| 6,034,460 | A | | 3/2000 | Tajima et al. | |
| 6,600,244 | B2 | * | 7/2003 | Okazaki | H02K 3/522 310/71 |
| 7,952,245 | B2 | | 5/2011 | Ueda et al. | |
| 2003/0173842 | A1 | | 9/2003 | Kobayashi et al. | |
| 2004/0070293 | A1 | | 4/2004 | Kabasawa et al. | |
| 2019/0068021 | A1 | * | 2/2019 | Willacker | H02K 3/24 |
| 2020/0153307 | A1 | * | 5/2020 | Abdallah | H02K 3/522 |

FOREIGN PATENT DOCUMENTS

JP 2005-086985 A 3/2005

* cited by examiner

*Primary Examiner* — Robert W Horn
(74) *Attorney, Agent, or Firm* — Mattingly & Malur, PC

(57) ABSTRACT

In some examples, at least one connecting ring may connect a plurality of stator coils of the same phase. For instance, the at least one connecting ring may include at least one linear conductor formed in a ring-like shape. The linear conductor may include a plurality of terminal sections, each terminal section including an open groove extending perpendicular to a plane formed by the ring-like shape. The open grooves may be positioned around a circumference of the connecting ring for receiving respective wire ends of respective stator coils inserted into the open grooves for forming an electrical connection between the respective wire ends and the connecting ring at the respective terminal sections.

20 Claims, 9 Drawing Sheets

POWER DISTRIBUTION FOR ROTARY ELECTRIC MACHINE

BACKGROUND

Power distribution for a rotary electric machine, such as an electric motor or generator, may include multiple phases. For example, in a three-phase stator, three conductors may each carry an alternating current of similar frequency and current amplitude relative to a common reference but with a phase difference of one third of a cycle between each of the three conductors. A fourth conductor, called the neutral conductor, may serve as the common reference for star-connection motors. Three-phase systems can produce a rotating magnetic field with a specified direction and speed. For example, the rotating magnetic field may be used to produce torque when coupled with a rotor filled with permanent magnet. However, manufacturing and assembling a power distributing apparatus for a rotary electric machine can be challenging. One example of an existing technique is set forth in U.S. Pat. No. 7,952,245, to Ueda et al., which is incorporated herein by reference.

SUMMARY

Some implementations include arrangements and techniques for connecting at least one connecting ring to a plurality of stator coils of the same phase. For instance, the at least one connecting ring may include at least one linear conductor formed in a ring-like shape. The linear conductor may include a plurality of terminal sections, each terminal section including an open groove extending perpendicular to a plane formed by the ring-like shape. The open grooves may be positioned around a circumference of the connecting ring for receiving respective wire ends of respective stator coils inserted into the open grooves for forming an electrical connection between the respective wire ends and the connecting ring at the respective terminal sections.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
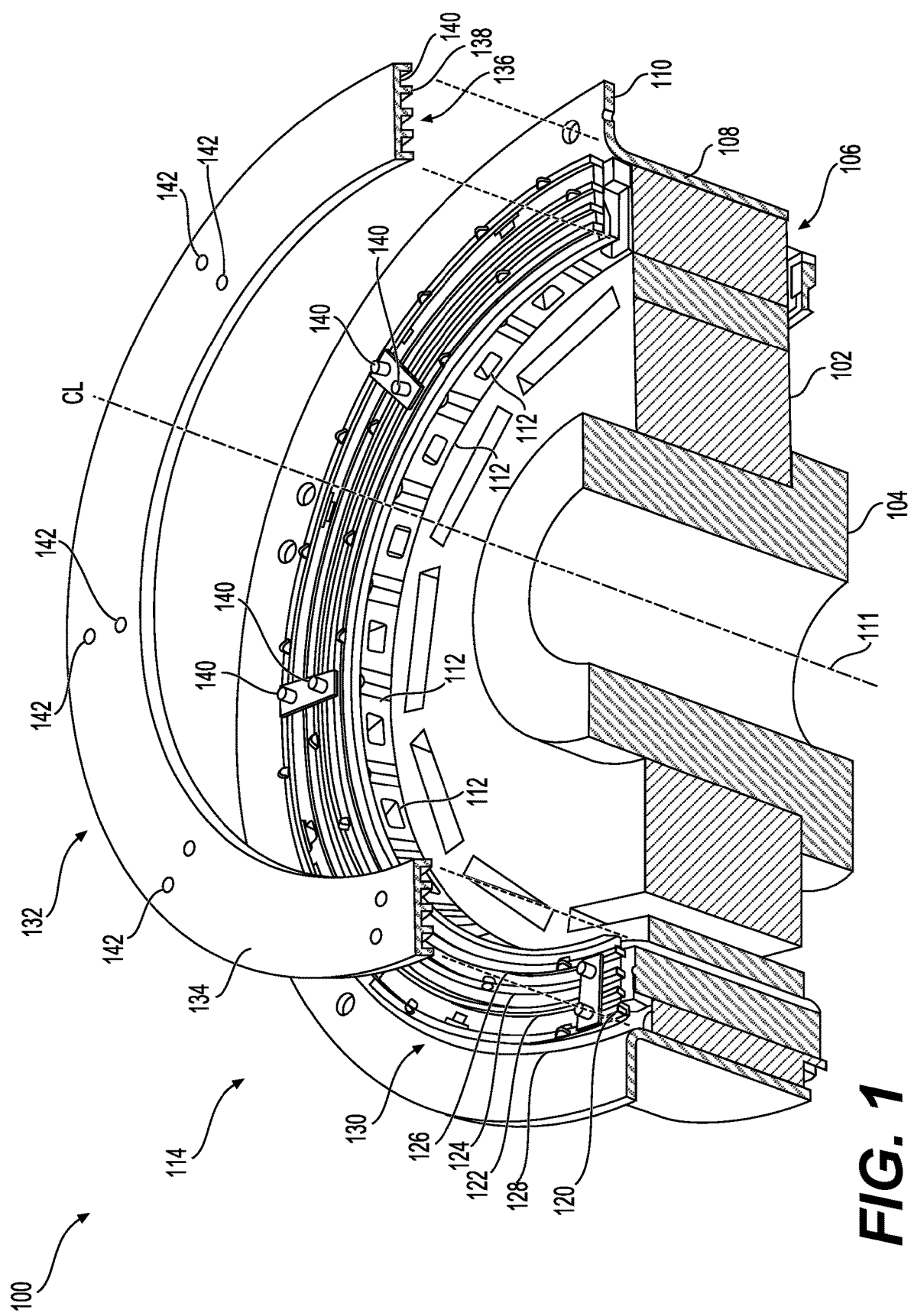
FIG. 1 illustrates a cross-sectional perspective view of a rotary electric machine having a power distribution arrangement according to some implementations.

The technology herein includes arrangements and techniques for power distribution in a multiple-phase rotary electric machine. For example, a power distribution apparatus herein may include a plurality of connecting rings to connect to a multi-coil stator of the rotary electric machine. The connecting rings may each include a plurality of open grooves formed in the sidewall of the connecting ring for electrically connecting wire ends from a plurality of stator coils to the connecting rings. The open grooves on the connecting rings enable the connecting rings to be assembled to the wire ends of the stator coils more quickly and accurately than in existing designs by allowing the connecting rings to mate with the stator wire ends without the wire ends being fully embedded in the connecting rings and without requiring the multiple assembly steps required by the existing designs.

The connecting rings herein may be formed from an elongated copper wire conductor having a rectangular cross section (in the examples herein the term "rectangular" encompasses "square") formed into a ring shape. A plurality of the open grooves may be formed in the sidewall of each connecting ring. The open grooves may be semicircular in cross section, and may be formed perpendicular to a radial direction of the connecting ring and perpendicular to a longitudinal axis of the copper wire conductor making up the connecting ring. The open grooves formed in the sidewall of the connecting ring allow the wire ends of the stator coils to be inserted within the open grooves during assembly of the connecting rings to the stator for forming electrical contacts between the wire ends and the connecting ring. The stator coil wire ends may further be secured within the respective grooves of the connecting ring, such as by welding, soldering, brazing, crimping, or the like, applied to a portion of the wire ends extending beyond a topside of the connecting ring.

The multiple connecting rings may be assembled into and supported in a mounting ring constructed of an insulative, dielectric, or otherwise non-conductive material, such as polyphenylene sulfide, or other polymers, monomers, or the like. As one example, the mounting ring may be insert molded around the connecting rings such that the connecting rings and the mounting ring form an integrated connecting ring assembly in which the connecting rings are partially embedded in the mounting ring. Holes formed in the mounting ring under the connecting rings may align with the open grooves in the connecting rings to enable insertion of the stator coil wire ends through the holes in the mounting ring and into the open grooves in the connecting rings.

With the mounting ring and the connecting rings forming a single integrated connecting ring assembly, the sizing and location of the holes in the mounting ring in cooperation with the open grooves in the connecting rings enables the connecting ring assembly to be assembled onto and engaged with the wire ends of the stator coils in a single step.

Furthermore, in some examples, a cover may be installed to overlie the connecting ring assembly following assembly of the connecting ring assembly to the stator coils. For example, the cover may be ring-like in shape, and may include a plurality of partitions on its underside that help to electrically insulate the individual connecting rings from each other. Thus, rather than subsequently applying an insulating material over the connecting rings following assembly to the stator coils, the cover may be placed over the connecting rings in a single installation step to provide an insulating cover for the connecting rings. The connecting ring assembly may include a plurality of radially spaced upwardly extending mounting pins that engage with mounting holes in the cover for securing the cover to the connecting ring assembly. Accordingly, as one example, the cover may be molded or otherwise constructed from an insulative, dielectric, or otherwise non-conductive material such as polyphenylene sulfide, or other polymers or monomer.

The stator in some examples herein may include a plurality of individual stator coils arranged in a circular configuration. Each stator coil may include two protruding wire ends extending upwards. When the connecting ring assembly is assembled to the plurality of stator coils, one of the wire ends of each stator coil may be connected to a neutral connecting ring and the other one of the wire ends may be connected to a connecting ring corresponding to one of the three phases (in the case of a three phase rotary machine with star-connection). Thus, the connecting ring assembly disclosed herein enables simplified assembly of the connecting ring assembly to the stator coil wire ends by enabling the wire ends to be placed into contact with their respective intended connecting rings of the four connecting rings in a single assembly step.

The implementations herein simplify the assembly process, reduce assembly time, and eliminate machining operations and complex assembly steps used in existing designs. The connecting rings herein may also require fewer steps in forming and machining as compared to existing designs.

For discussion purposes, some example implementations are described in the environment of a three-phase electric motor. However, implementations herein are not limited to the particular examples provided, and may be extended to other service environments, other types of rotary electrical machines, or the like, as will be apparent to those of skill in the art in light of the disclosure herein. For instance, while the power distribution arrangement disclosed herein may be employed in a concentrated-winding three-phase brushless permanent magnet motor to be used in a vehicle, or the like, the arrangement is not limited to such use, but may also be used in an induction motor, other types of electric motors, generators, alternators, dynamos, or in various other rotary electric machines.

FIG. 1 illustrates a cross-sectional perspective view of a rotary electric machine 100 having a power distribution arrangement according to some implementations. In this example, the rotary electric machine is a three-phase electric motor, although examples herein are not limited to such, as discussed above. The rotary electric machine 100 may be of a concentrated winding type intended for use in restricted spaces. The rotary electric machine 100 includes a rotor 102, which is fitted with a shaft collar 104, and which may be coupled to a drive shaft or other drivetrain component (not shown), such as of a vehicle or other machine, e.g., through a switching device, such as a clutch (not shown).

A stator 106 is fixed to a housing 108 that includes a flange 110 for mounting the rotary electric machine 100 to a fixed support, fixture, mounting surface, or the like (not shown). As is known in the art, the rotor 102 is rotatable relative to the stator 106 around a central axis of rotation 111, such as when electric current is supplied to the stator 106. For instance, the rotary electric machine 100 may be supplied with electric power to drive a vehicle (not shown) or to supplementarily assist an internal combustion engine (not shown). In addition, if the rotor 102 is driven mechanically, such as when a vehicle is slowing down, the rotary electric machine 100 may be used to convert a portion of the vehicle's kinetic energy to electric power while assisting in slowing the vehicle.

In the illustrated example, the rotary electric machine 100 may be of a three-phase alternating current (AC) type. For instance, an inverter (not shown) may receive high-voltage direct current (DC) from a battery (not shown) and may convert the DC current to three-phase AC power. A plurality of stator coils 112 are included in the stator 106 and arranged in a circular configuration around the rotor 102. The stator coils 112 may be connected with a power distribution apparatus 114 so that individual ones of the stator coils 112 correspond to one of the three phases, i.e., a U-phase, a V-phase, or a W-phase, in a successive pattern, e.g., U, V, W, U, V, W, and so forth.

The power distribution apparatus 114 may include four connecting rings, namely a neutral (N) connecting ring 120, a U-phase connecting ring 122, a V-phase connecting ring 124, and a W-phase connecting ring 126. The connecting rings 120-126 may be disposed in a mounting ring 128, as discussed additionally below, to form a connecting ring assembly 130. Implementations herein are not limited by the order of the location of the connecting rings 120-126 from the axis of rotation 111.

As illustrated and described additionally below, each stator coil 112 includes a first end wire that connects to the N connecting ring 120 and a second end wire that connects to one of the U, V, or W connecting rings 122, 124, or 126, respectively. Accordingly, when three-phase power is supplied to the power distribution apparatus 114, the alternating phases supplied successively to the respective stator coils 112 cause the rotor to rotate around the axis of rotation 111.

In addition, the power distribution apparatus 114 includes a ring-shaped cover 132 (illustrated prior to installation in this example) that may be installed over the connecting rings 120-126 to insulate and protect the power distribution apparatus 114. As one example, the cover 132 may be molded or otherwise constructed from an insulative, dielectric, or otherwise non-conductive material such as polyphenylene sulfide, or other polymers or monomers. The cover 132 may be installed to overlie the connecting ring assembly 130 following assembly of the connecting ring assembly 130 to wire ends of the stator coils 112.

Furthermore, the cover 132 may include a topside 134 and an underside 136. A plurality of partitions 138 may be formed on the underside 136 of the cover 132 and may extend downward therefrom. The plurality of partitions 138 form a plurality of concentric circular slots 140 for receiving respective ones of the connecting rings 120-126 when the cover 132 is installed on the connecting ring assembly 130. For example, the partitions 138 help to electrically insulate the individual connecting rings 120-126 from each other, while the cover 132 also electrically insulates and protects the power distribution apparatus 114 from possible contact with external objects.

The cover 132 may be placed over the connecting ring assembly 132 in a single installation step. The connecting ring assembly 130 may include a plurality of radially spaced upwardly extending mounting pins 140 that engage with mounting holes 142 in the cover 132 for securing the cover 132 to the connecting ring assembly 130. Further, while approximately half of the cover 132 is illustrated in this example, the other half of the cover 132 may be generally a mirror image, but with several additional openings in the topside 134, as discussed additionally below.

Figure 2:
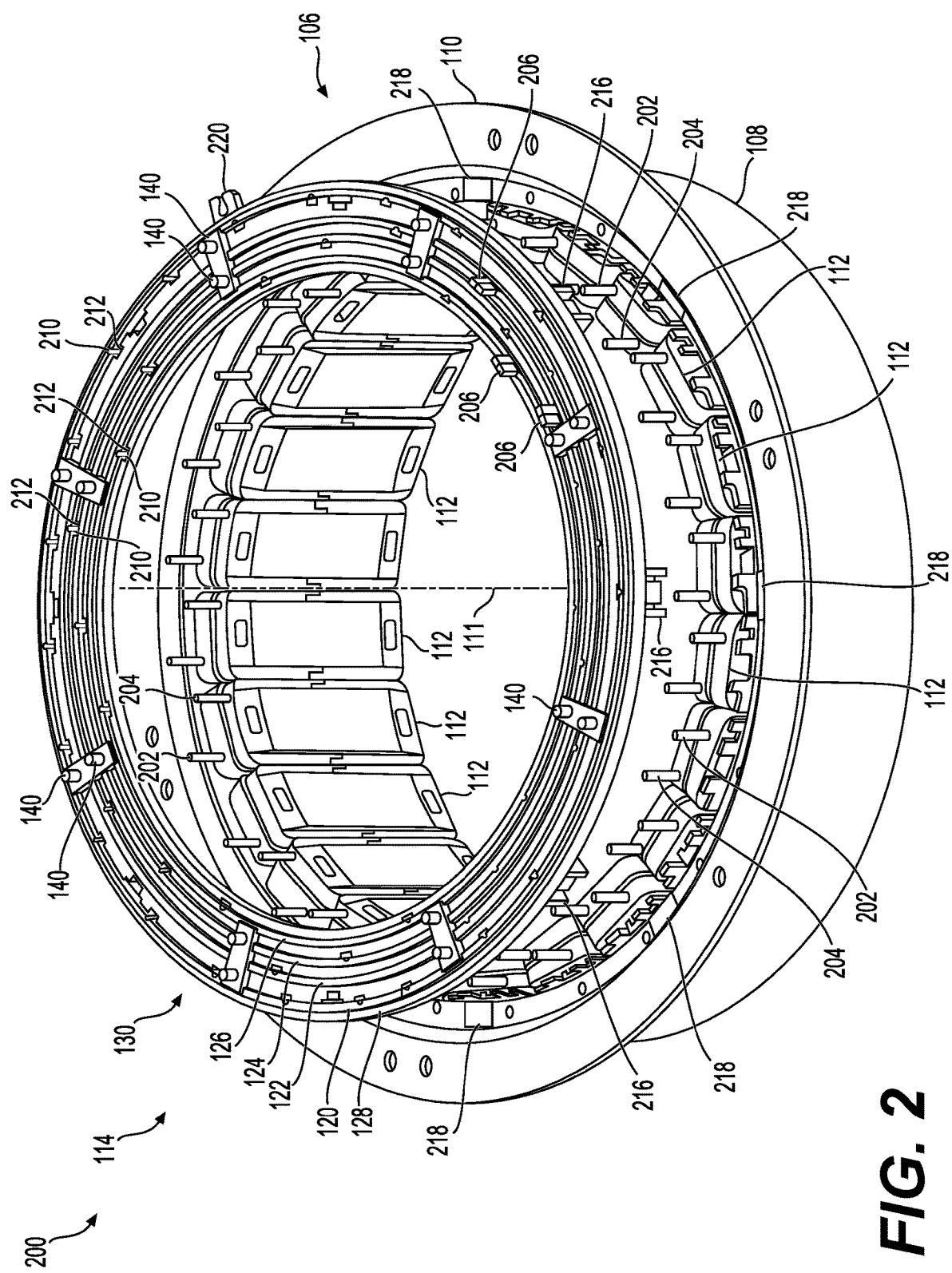
FIG. 2 illustrates an exploded perspective view of the connecting ring assembly and a stator according to some implementations.

FIG. 2 illustrates an exploded perspective view 200 of the connecting ring assembly 130 and the stator 106 according to some implementations. In the illustrated example, the connecting ring assembly 130 is shown prior to installation onto the stator 106. As mentioned above, the stator 106 includes a plurality of stator coils 112 arranged in a circular configuration within the cylindrical housing 108. As described additionally below with respect to FIG. 8, the stator coils 112 may each include a length of a conductor, such as a wire, wound multiple times around a core to provide an electromagnetic effect when electric current passes through the wire. The wire may be insulated, such as with an enamel coating or other suitable insulator, to prevent short-circuiting between the windings within the stator coil. The plurality of stator coils 112 may be pressed, shrunk fit, or otherwise adhered to the stator housing 108 to form the stator 106 as a hollow cylinder.

The stator coils 112 are arranged within the housing 108 such that respective first and second wire ends 202 and 204 of each of the respective stator coils 112 extend upward in a direction parallel to the axis of rotation 111 of the rotary electric machine. The insulation coating is removed from the wire ends 202, 204 so that an electrical connection can be established between the wire ends 202, 204 and select pairs of the connecting rings 120-126. For example, the first wire end 202 of each stator coil 112 may be positioned to contact the N connecting ring 120 when the connecting ring assembly 130 is installed on the stator 106. Furthermore, the second wire end 204 may be positioned to contact one of the phase power connecting rings, i.e., one of the U connecting ring 122, the V connecting ring 124, or the W connecting ring 126. Accordingly, the distance of the first wire end 202 from the axis of rotation 111 may be the same for each of the stator coils 112 while the distances of the second wire ends 204 may be staggered for the respective stator coils 112 depending on whether the respective stator coil 112 is intended to connect to the U-phase, the V-phase, or the W-phase power.

In the illustrated example, there are 24 stator coils 112, and therefore, 8 stator coils 112 are designated for U-phase power, 8 stator coils 112 are designated for V-phase power, and 8 stator coils 112 are designated for W-phase power. Of course, more or fewer stator coils 112 may be used in other examples. As mentioned above, the stator coils are arranged successively in a pattern U, V, W, U, V, W . . . , so that, in the case that three-phase power is applied to the power distribution apparatus, the peak current moves successively from one set of stator coils 112 to the next to impart a rotational force to the rotor described above with respect to FIG. 1.

The phase power connecting rings 122-126 may each include a power terminal 206 that extends upward from the respective connecting ring 122, 124, or 126 for connecting to a one of the U-phase, V-phase, or W-phase, respectively, through respective high voltage AC cables, or the like (not shown in FIG. 2). The cover 132 discussed above with respect to FIG. 1 may include openings in the upper surface 134 for enabling the power terminals 206 to pass through the cover 132 for connection to the high voltage AC cables when the cover 132 is installed over the connecting ring assembly 130. The N connecting ring 120 may connect to the housing 108 of the stator 106, which may connect to a common reference (e.g., an electrical common or ground), and therefore, the N connecting ring 120 may not include a terminal 206 in some examples.

As discussed additionally below, each of the phase power connecting rings 122, 124, and 126 may include a plurality of open grooves 210 formed in the sidewalls of the connecting rings 122, 124, and 126 for contacting a second wire end 204 of a respective stator coil 112. For instance in the case that there are 24 stator coils 112, each of the phase power connecting rings 122, 124 and 126 may have 8 open grooves distributed generally symmetrically around the inner circumference of the connecting ring 122, 124 or 126. Alternatively, in other examples, the open grooves 210 may be formed on the outer sidewall on the outer circumference of the connecting rings 122, 124 and 126, or combinations thereof.

Furthermore, in this example, the N connecting ring 120 may have 24 open grooves 210 distributed generally symmetrically on its sidewall around the inner circumference of the N connecting ring 120 for contacting the first wire ends 202 of each of the 24 stator coils 112. Alternatively, in other examples, the open grooves 210 may be formed on the outer sidewall on the outer circumference of the N connecting ring 120, or combinations thereof.

As shown in additional detail below, the open grooves 210 are aligned with wire-receiving openings 212 in the mounting ring 128. The connecting rings 120-126 are disposed concentrically within the mounting ring 128 and positioned for aligning with the respective stator coils 112. For instance, as mentioned above, the mounting ring 128 may be molded around the connecting rings 120-126 in some examples, such as by insert molding. Alternatively, the connecting rings 120-126 may be inserted into the mounting ring 128 by various assembly techniques.

The mounting ring 128 may include a plurality of alignment tabs 216 extending downward for enabling proper alignment of the connecting ring assembly 130 during assembly to the stator 106. For example, the alignment tabs 216 may be inserted into corresponding mating holes 218 located around the perimeter of the stator coils 112. Further, the mounting ring 128 may include a fastener bracket 222 that may receive a machine screw or the like for fasting the connecting ring assembly 130 to the stator housing 110.

Figure 3:
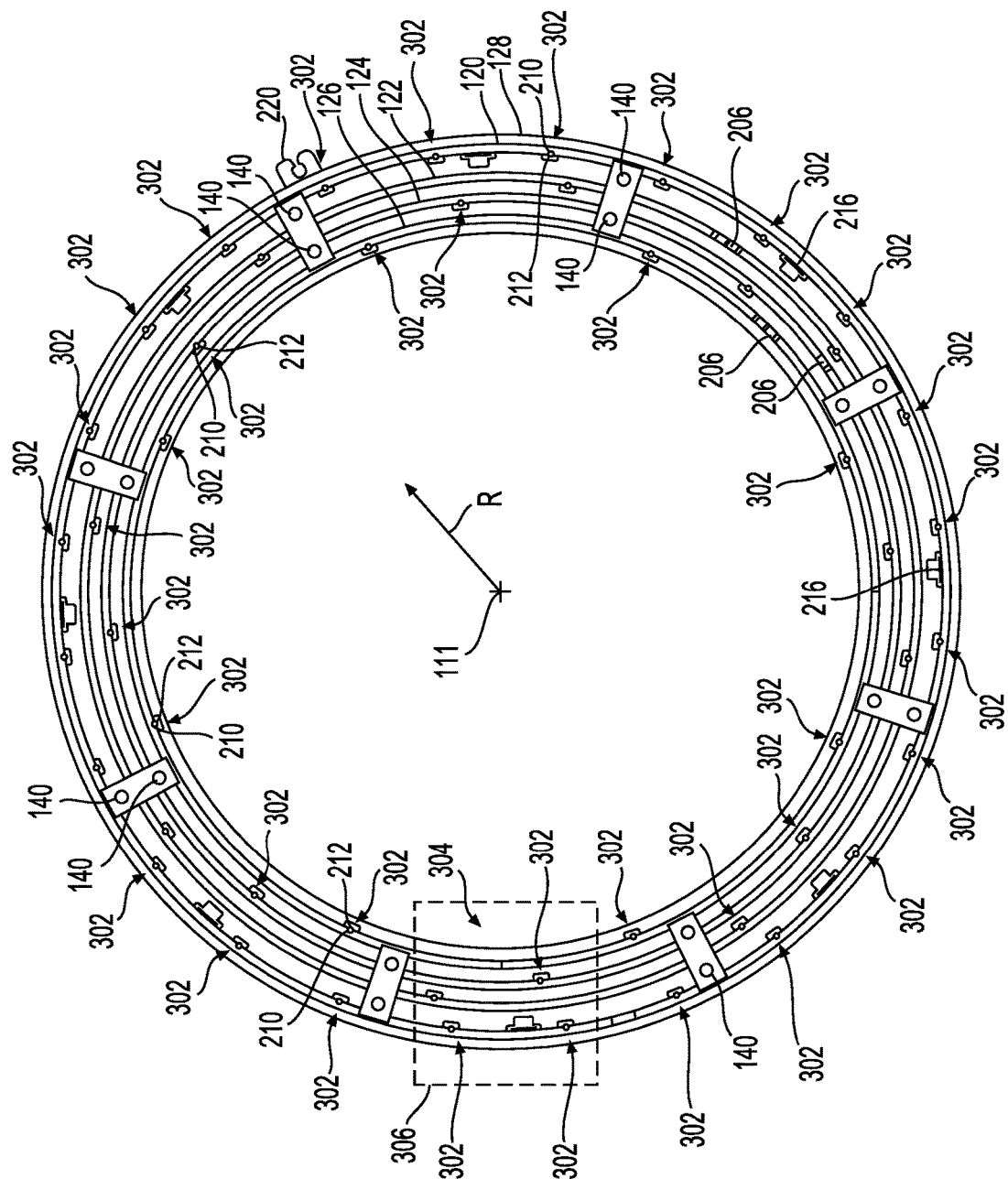
FIG. 3 illustrates a plan view of the connecting ring assembly according to some implementations.

FIG. 3 illustrates a plan view of the connecting ring assembly 130 according to some implementations. In this example, the connecting ring assembly 130 includes the connecting rings 120-126 arranged concentrically in the mounting ring 128. As mentioned above, the connecting rings 122, 124, and 126 may correspond to the U-phase, V-phase, and W-phase power, respectively, and the N connecting ring 120 may correspond to a neutral point of a star connection. The connecting rings 120-126 are each in the form of a circular ring and each include a plurality of stator coil connection terminal sections 302, e.g., 8 terminal sections 302 each for the connecting rings 122-126 and 24 terminals for the connecting ring 120 in this example. As mentioned above, each terminal section 302 may include an open groove 210 formed in the sidewall of the connecting ring and extending in a direction parallel to the axis of rotation 111 of the rotary electric machine, which may be perpendicular to a plane formed by the ring-like shape of the connecting ring conductor and which may be parallel to a direction in which the wire ends of the stator coils 112 extend.

The connecting rings 120-126 may each include a single conductor (i.e., a linear conductor, such as a wire) coated with an insulation material. The linear conductors may each be rounded or otherwise shaped into a circular ring as illustrated. The insulation coating of each of the connecting rings 120-126 may be removed at the location of the stator coil connecting terminal sections 302 to enable a robust electrical connection with the wire ends of the stator coils. The open groove 210 at each terminal section 302 aligns with a respective wire-receiving opening 212 formed through the mounting ring 128, and through which the wire ends 202 or 204 of the stator coils 112 (not shown in FIG. 3) are to be inserted. In the illustrated example, the connecting rings 120-126 are arranged in the circular mounting ring 128 in a concentric fashion with the connecting ring 120 having the largest diameter, the connecting ring 126 having the smallest diameter, and the connecting rings 122 and 124 having diameters between the diameters of the connecting rings 120 and 126 in the radial direction R.

The stator-wire-receiving terminal sections 302 of the connecting rings 122-126 are arranged staggered in a circumferential direction so that they are not adjacent to each other. For example, the terminal sections 302 of the connecting rings 122-126 are arranged such that they do not substantially align in a radial direction. That is, the terminal sections 302 are arranged in a fashion such that assuming an imaginary line in the radial direction passes through any one terminal of one phase, another terminal of different phase is offset from the imaginary line in the circumferential direction to achieve a predetermined distance between the two terminals of the connecting rings for different phases.

As mentioned above, the open grooves 210 in the connecting rings 120-126 are aligned with wire-receiving openings 212 in the mounting ring 128. The connecting rings 120-126 are positioned for aligning with the wire ends of the respective stator coils 112, e.g., as discussed above with respect to FIGS. 1 and 2. In some examples, the mounting ring 128 may be molded around the connecting rings 120-126, such as by insert molding or any other suitable technique. Alternatively, the connecting rings 120-126 may be inserted into the mounting ring 128 following fabrication of the mounting ring 128 by various assembly techniques. An enlarged detail view of a portion 302 of the mounting ring assembly 130 is illustrated in FIG. 4, as indicated by dashed line 306.

In addition, as mentioned above, the phase power connecting rings 122, 124, and 126 each include one of the phase power supply terminals 206 extending upward from the surface of the respective connecting ring 122-126. The insulating material may be removed from the power supply terminals 206 to enable electrical connection with a high-voltage AC cable or the like (not shown in FIG. 3).

Figure 4:
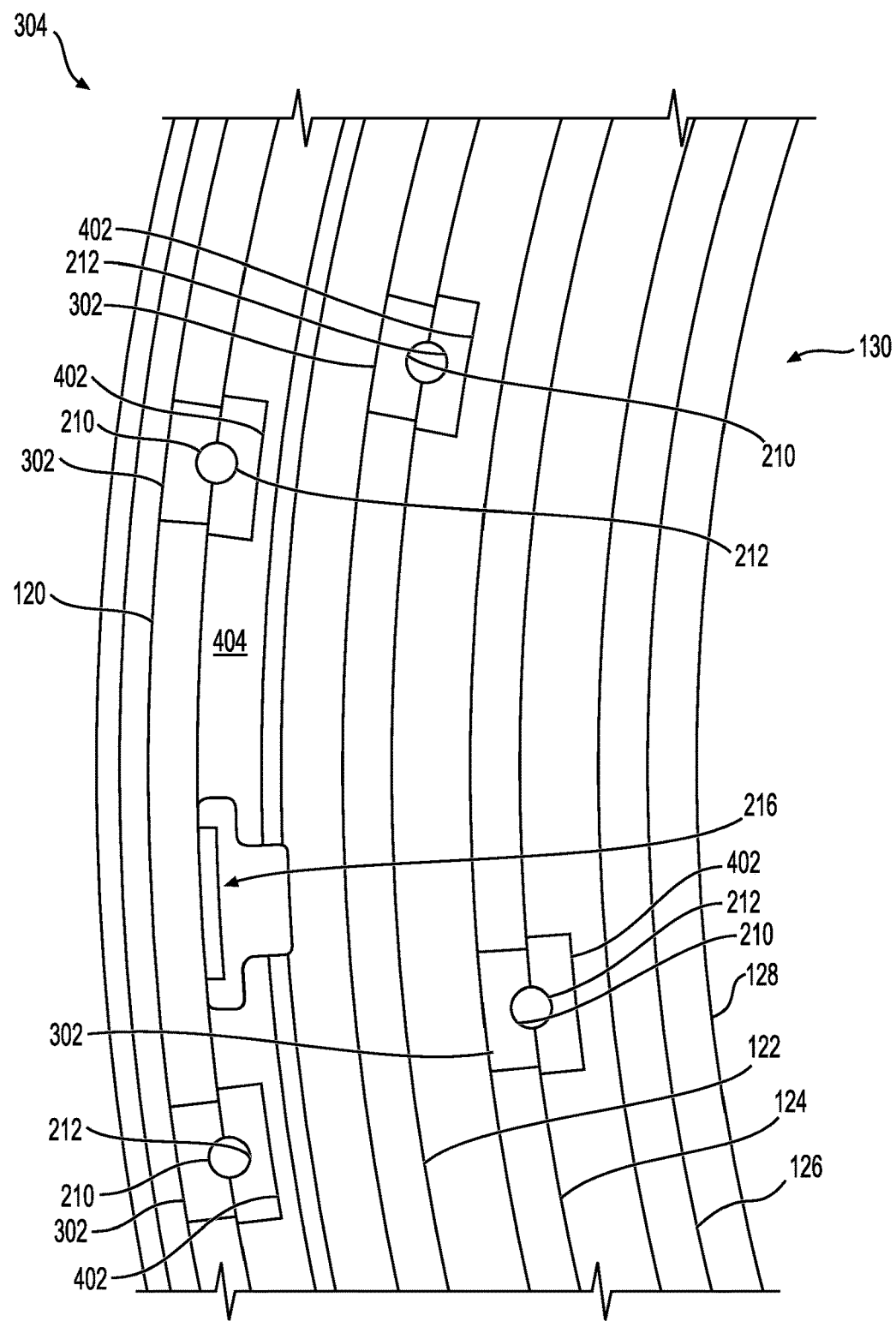
FIG. 4 illustrates an enlarged view of a portion of the connecting ring assembly, as indicated by the dashed line of FIG. 3, according to some implementations.

FIG. 4 illustrates an enlarged view of a portion 304 of the connecting ring assembly 130, as indicated by the dashed line 306 of FIG. 3, according to some implementations. This example illustrates four terminal sections 302, including two terminal sections 302 in the connecting ring 120, a terminal section 302 in the connecting ring 122, and a terminal section 302 in the connecting ring 124. As mentioned above, each of the phase power connecting rings 122-126 may include 8 terminal sections 302 in some examples, while the N connecting ring 120 may include 24 terminal sections 302 in some examples. Each terminal section 302 includes a respective open groove 210, which is semicircular in cross-section in this example.

Furthermore, a trench 402 may be formed in the upper surface 404 of the mounting ring 128 adjacent to each terminal section 302 and may extend partially into the surface 404 of the mounting ring 128. For example, the trench 402 may prevent the material of the mounting ring 128 from melting during a welding, soldering, brazing, etc., operation performed at each terminal section 302 during assembly of the connecting ring assembly 130 to the stator 106 as discussed additionally below. This can help prevent distortion of the wire-end-receiving openings 212 formed in the mounting ring 128 in alignment with the open grooves 210 in the terminal sections 302.

Figure 5:
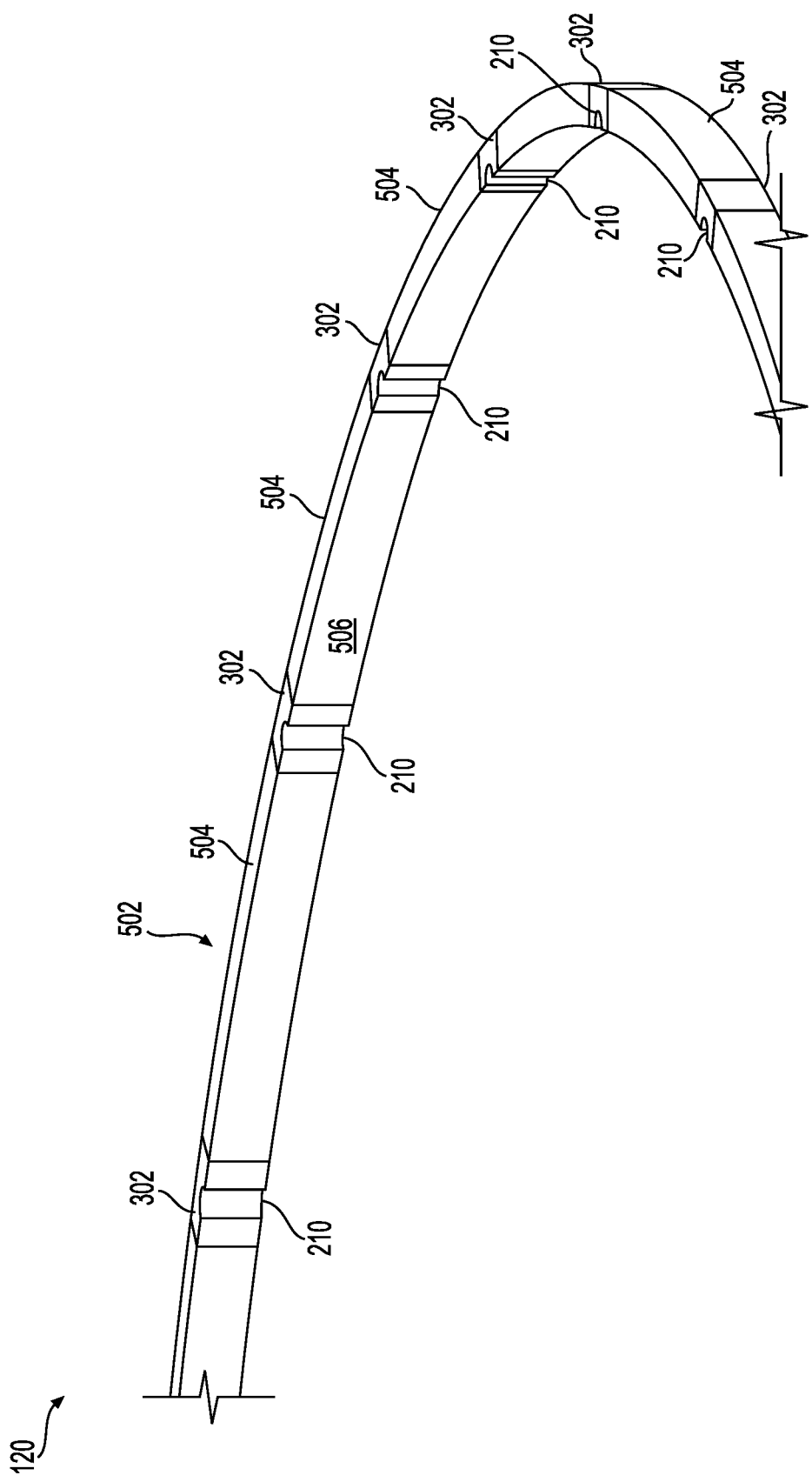
FIG. 5 illustrates an enlarged perspective view of a portion of the connecting ring according to some implementations.

FIG. 5 illustrates an enlarged perspective view of a portion of the connecting ring 120 according to some implementations. Furthermore, while, the connecting ring 120 is illustrated in FIG. 5, the connecting rings 122-126 may include a similar construction, but with fewer stator wire connecting terminal sections 302. The connecting ring 120 includes a single conductor 502 (i.e., a linear conductor, such as a wire) having a rectangular cross section or other suitable shape. The conductor 502 is coated with an insulation material 504 and formed into a circular ring shape. The insulation coating 504 of the conductor 502 is removed at the terminal sections 302 to enable an electrical connection with the wire ends of the stator coils (not shown in FIG. 5).

In this example, the open grooves 210 are formed on an inner sidewall 506 of the connecting ring 120. In other examples, the open grooves 210 may be formed on the outer sidewall of the connecting ring 120 or combinations thereof (not shown in FIG. 5).

Figure 6:
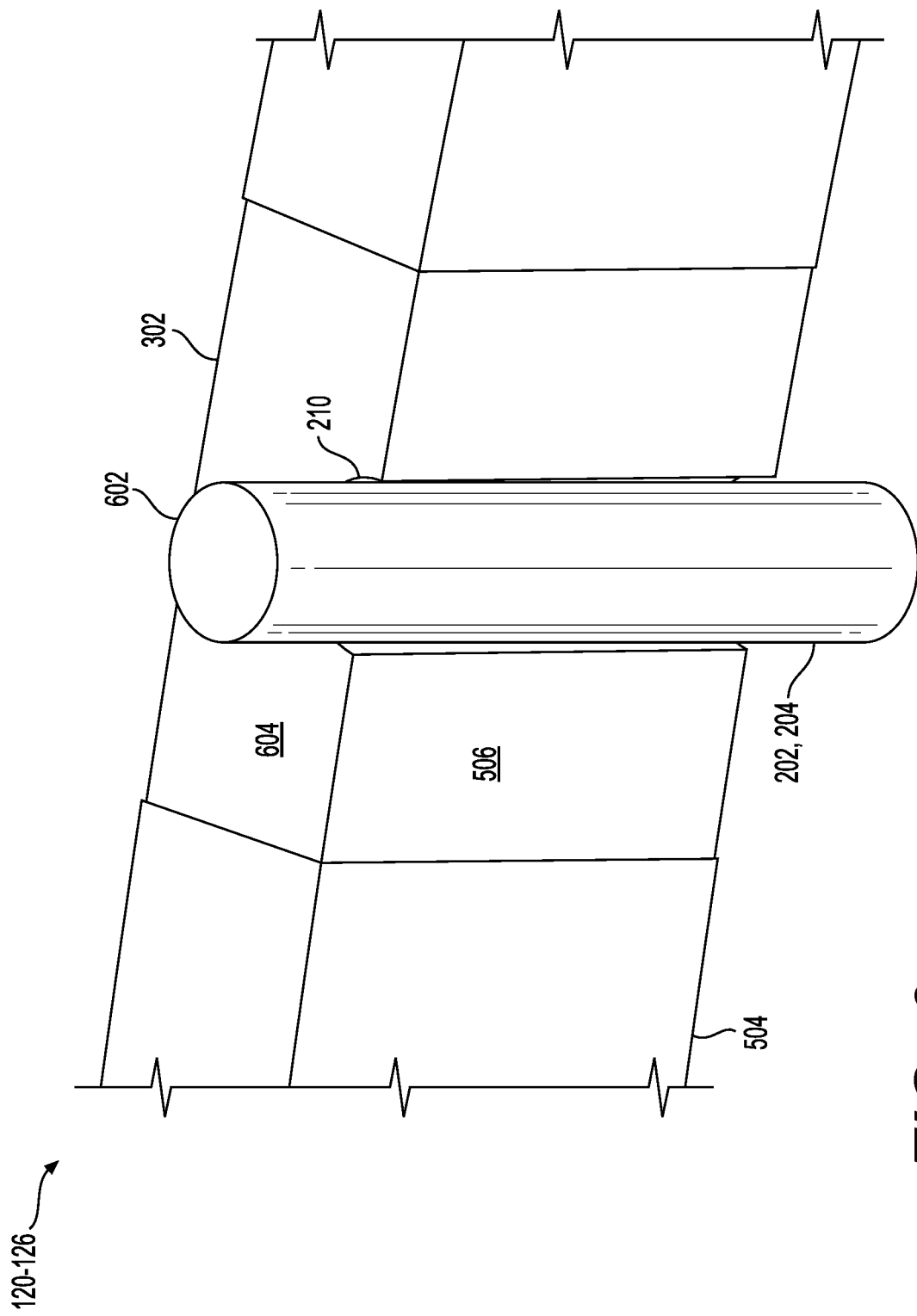
FIG. 6 illustrates an enlarged perspective view of a terminal of one of the connecting rings according to some implementations.

FIG. 6 illustrates an enlarged perspective view of a terminal section 302 of one of the connecting rings 120-126 according to some implementations. In this example, a wire end 202 or 204 is shown inserted into the open groove 210 at the terminal section 302. The open groove 210 may be semicircular in cross-section and may have a diameter that is slightly larger than a diameter of the wire and 202 or 204. Furthermore, in other examples, rather than being semicircular in cross-section, the open groove 210 may have any of various other suitable cross-sectional shapes such as rectangular, triangular, and so forth, as will be apparent to those of skill in the art having the benefit of the disclosure herein. Additionally, in some cases, the wire ends 202 and 204 of the stator coils may be rectangular, triangular, or of a different shape in cross section. For instance, rather than being round in cross section, as illustrated, in some examples, the wire used to form the stator coils may have a rectangular cross section, triangular cross section, or other shape.

A distal end 602 of the wire end 202 or 204 may extend beyond the upper surface 604 of the connecting ring 120-126. As discussed additionally below, welding, soldering, brazing, or other technique may be used to secure the distal end 602 of the wire end 202 or 204 to the upper surface 604 of the connecting ring 120-126, thereby securing the wire end 202 or 204 within the groove 210.

Figure 7:
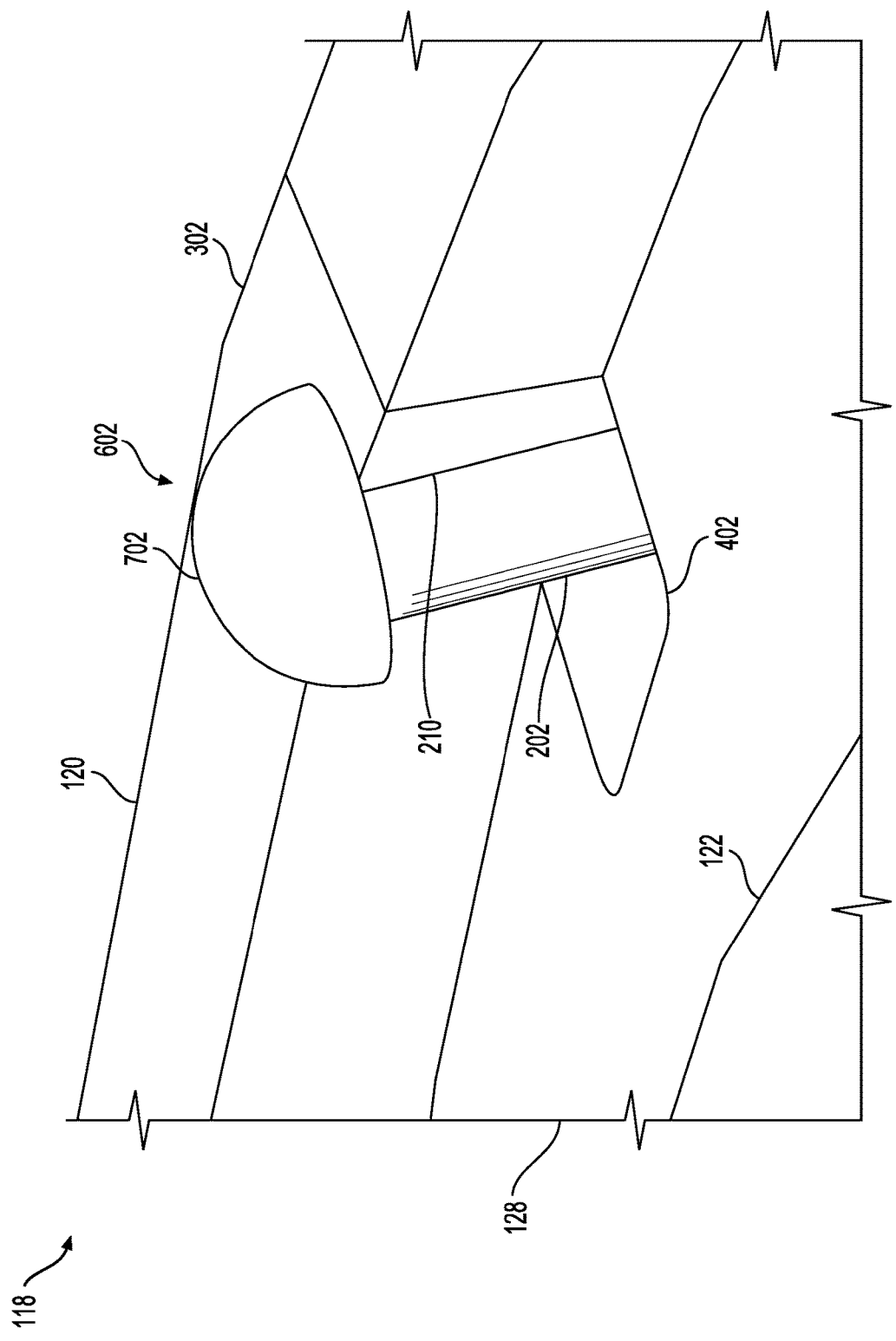
FIG. 7 illustrates an enlarged perspective view of a portion of the connecting ring disposed in the mounting ring following assembly according to some implementations.

FIG. 7 illustrates an enlarged perspective view of a portion of the connecting ring 120 disposed in the mounting ring 128 following assembly according to some implementations. In this example, the wire end 202 has been inserted through the opening (not visible in this view) in the mounting ring 128 and into the semicircular open groove 210 at one of the terminal sections 302 of the connecting ring 120. Furthermore, as indicated at 702, a weld bead, solder bead, or the like, has been applied over the distal end 602 of the wire end 202, thereby securing the wire end 202 in the open groove 210 and preventing removal therefrom. As one example, TIG (tungsten inert gas) welding may be used to form the weld bead, as indicated at 702, which makes the connection stable due to thermal balance upon welding.

In some examples, an insulation coating may be applied on the respective areas of the terminal sections 302 and then cured. This may increase the quality of insulation between the connecting rings to a further extent. However, in other examples, additional insulation is not applied, and the cover 132 discussed above with respect to FIG. 1 is applied to serve as insulation for the terminal sections 302 and the connecting rings 120-126.

Figure 8:
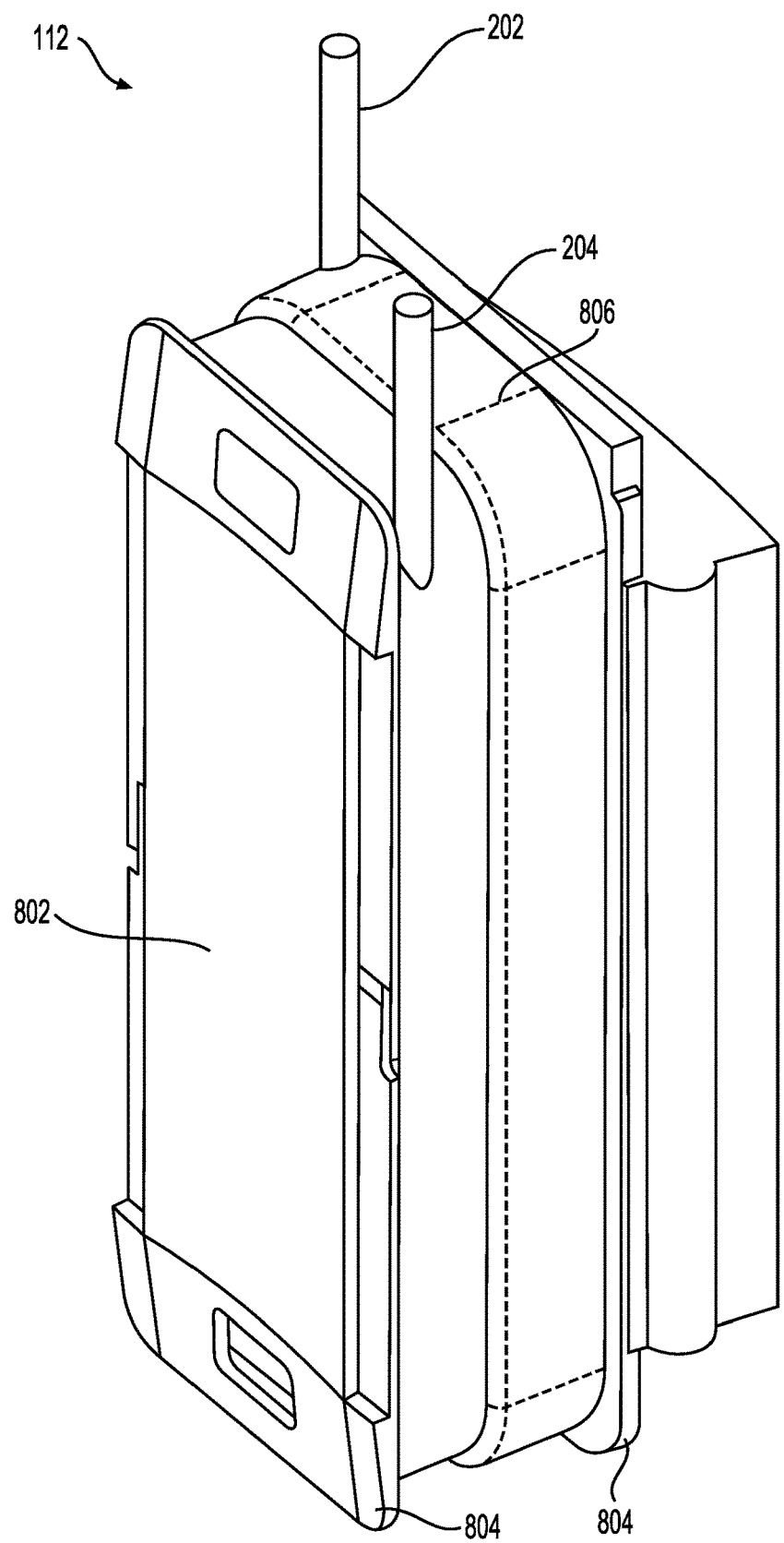
FIG. 8 illustrates a perspective view of an individual stator coil according to some implementations.

FIG. 8 illustrates a perspective view of an individual stator coil 112 according to some implementations. The stator coil 112 includes a core section 802 that protrudes inward in the radial direction when the stator coil is mounted in the stator housing as discussed above with respect to FIG. 1. A conductor with an insulation coating (e.g., an enameled wire) is wound around the core section 802 via a bobbin 804 made of an insulating material to form a wire coil 806. As mentioned above, the conductor may be of any suitable shape in cross section, such as circular, oval, rectangular, triangular, and so forth, as will be apparent to those of skill in the art having the benefit of the disclosure herein.

FIG. 8 illustrates the appearance of the wire coil 806 after winding. The coil wire ends 202 and 204 at the start and the end of the coil winding extend upward from the stator coil 112 and the insulation coating may be removed from the wire ends 202 and 204. Accordingly, the wire ends 202 and 204 extend upward in a direction generally parallel to the axis of rotation of the rotary electric machine. As mentioned above, the first wire end 202 is intended to engage with a terminal of the N connecting ring 120 as a neutral point, and the second wire end 204 is intended to engage with one of the terminal sections 302 of one of the phase power connecting rings 122, 124, or 126, which serve as wire connections for U-phase, V-phase, W-phase power, respectively, e.g., as discussed above with respect to FIGS. 1 and 2.

Figure 9:
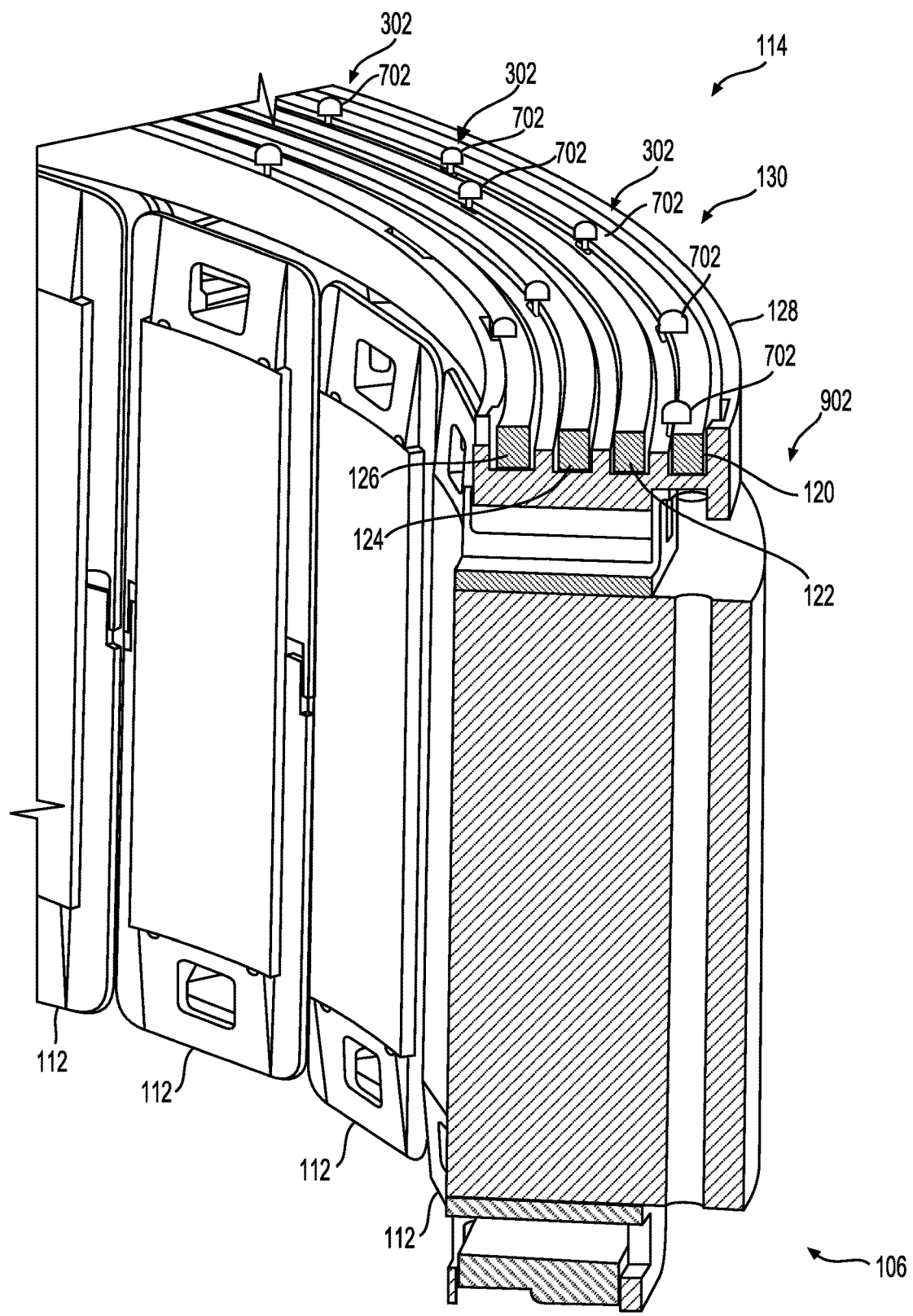
FIG. 9 illustrates a cross-sectional perspective view of the stator assembled to the power distribution apparatus according to some implementations.

FIG. 9 illustrates a cross-sectional perspective view of the stator 106 assembled to the power distribution apparatus 114 according to some implementations. During assembly of the power distribution apparatus 114 to the stator 106, the wire ends 202 and 204 of the stator coils 112 are inserted through the openings in the mounting ring 128 and into the open grooves of the connecting rings 120-126, as discussed above. Furthermore, the wire ends 202 and 204 may be secured in place, as indicated at 702, e.g., by soldering, brazing, welding, crimping, or the like.

The power distribution apparatus 114 is disposed above an end face 902 of the plurality of stator coils 112. Thus, the power distribution apparatus 114 formed as an annular ring may be assembled to the stator 106 by insertion of the coil ends 202 and 204 of the plurality of stator coils 112 into the openings 212 in the mounting ring 128 and the open grooves 210 (not visible in FIG. 9) in a single assembly step, so that the stator coils 112 are connected to the correct intended phase, and also connected to the neutral points in common. Following assembly as shown in FIG. 9, the cover 132 discussed above with respect to FIG. 1 may be applied over the connecting ring assembly 130.

From the foregoing, it may be seen that the power distribution apparatus 114 provides a plurality of connecting rings arranged substantially in a concentric fashion in the same plane, so that there is no overlap of the connecting rings in the axial direction of the rotary electric machine. Accordingly, the power distribution apparatus 114 can be made compact in the direction of the axis of the rotary electric machine. Further, the power distribution apparatus 114 can be constructed to have a height generally not much higher than that of a single connecting ring, so that the space on the end face 902 of the stator 106 in the axial direction thereof can be minimized and the size of the rotary electric machine in the axial direction thereof can be reduced.

In addition, the rotary electric machine herein may be constructed such that the wire ends of the stator coils 112 may be inserted into the open grooves of the terminals of the connecting rings for connection and welded or otherwise fastened in place without using other connection components. As a result, the number of components can be reduced to decrease cost for parts and hence production cost.

The terminal sections 302 to which the wire ends of the stator coils 112 of the different phases are connected are staggered in the circumferential direction approximately by the width of one stator coil 112 so that the terminal sections 302 are not adjacent in the circumferential direction between the different phases. As a result, the distance of insulation is relatively large, thus increasing the quality of insulation. Furthermore, as discussed above, the connecting ring excluding the terminal section 302 is coated with the insulation material and the terminal sections are disposed without being adjacent to each other. As a result, a sufficient insulation distance can be secured between adjacent connecting rings. This prevents occurrences of shortage between the phases and of insulation failure due to partial discharge.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A power distribution apparatus for a rotary electric machine, the power distribution apparatus comprising:
    at least one connecting ring that connects a plurality of stator coils of the same phase, the at least one connecting ring including at least one linear conductor formed in a ring-like shape, the at least one connecting ring including a plurality of terminal sections integrally formed in the linear conductor,
    each terminal section including an open groove extending in a direction parallel to an axis of rotation of the rotary electric machine, each open groove receiving a respective wire end of a respective stator coil inserted into the open groove for forming an electrical connection between the respective wire end and the connecting ring at a respective terminal section.

2. The power distribution apparatus as recited in claim 1, wherein:
    a distal end of the respective wire end extends beyond a topside of the at least one connecting ring when the respective wire end is inserted into the open groove; and
    the respective wire end is secured to the respective terminal section by at least one of welding, soldering, brazing, or crimping the distal end of the respective wire end.

3. The power distribution apparatus as recited in claim 1, wherein:
    the connecting ring has a rectangular cross section, with an inner sidewall and an outer sidewall; and
    the open groove is formed in one of the inner sidewall or the outer sidewall of the at least one connecting ring.

4. The power distribution apparatus as recited in claim 1, further comprising a mounting ring supporting the at least one connecting ring, wherein the mounting ring is constructed of a non-conductive material.

5. The power distribution apparatus as recited in claim 4, wherein the mounting ring includes a respective opening aligned with each respective open groove for receiving the respective wire end inserted into the respective open groove.

6. The power distribution apparatus as recited in claim 1, wherein there are a plurality of the connecting rings supported in the mounting ring, including at least one connecting ring connected to a multiple-phase power connection and a neutral connecting ring connected to a common reference.

7. The power distribution apparatus as recited in claim 6, further comprising an insulating cover applied over the plurality of connecting rings, the insulating cover including a least one partition extending between two of the connecting rings for providing insulation between the two connecting rings.

8. A rotary electric machine comprising:
a stator including a plurality of stator coils arranged in a circular configuration; and
a power distribution apparatus assembled to the plurality of stator coils, the power distribution apparatus having a ring shape and including a plurality of connecting rings,
each connecting ring including a linear conductor formed into a ring-like shape and having a plurality of terminal sections for engaging with respective wire ends extending outward from respective stator coils of the plurality of stator coils, respective ones of the terminal sections engaging with respective ones of the wire ends by receiving the respective wire ends into respective open grooves formed in the respective terminal sections, each respective open groove being formed in a sidewall of a respective connecting ring at the respective terminal section and extending in a direction parallel to the wire ends.

9. The rotary electric machine as recited in claim 8, wherein:
a distal end of the respective wire end extends beyond a topside of the connecting rings when the respective wire end is inserted into the open groove; and
the respective wire end is secured to the respective terminal section by at least one of welding, soldering, brazing, or crimping the distal end of the respective wire end.

10. The rotary electric machine as recited in claim 8, wherein:
the connecting ring has a rectangular cross section, with an inner sidewall and an outer sidewall; and
the open groove is formed in one of the inner sidewall or the outer sidewall of the connecting rings.

11. The rotary electric machine as recited in claim 8, further comprising a mounting ring supporting the plurality of connecting rings, wherein the mounting ring is constructed of a non-conductive material.

12. The rotary electric machine as recited in claim 11, wherein the mounting ring includes a respective opening aligned with each respective open groove for enabling the respective wire end to be inserted into the respective open groove.

13. The rotary electric machine as recited in claim 8, wherein:
there are three phase power connecting rings and a neutral ring; and
a first wire end of each stator coil connects to the respective open groove in the neutral ring and a second wire end of each stator coil connects to the respective open groove in one of the phase power connecting rings.

14. The rotary electric machine as recited in claim 8, further comprising an insulating cover applied over the plurality of connecting rings, the insulating cover including a least one partition extending between two of the connecting rings for providing insulation between the two connecting rings.

15. An apparatus comprising:
at least one connecting ring to connect a plurality of stator coils of the same phase, the at least one connecting ring including at least one linear conductor formed in a ring-like shape, the linear conductor including a plurality of terminal sections, each terminal section including an open groove extending perpendicular to a plane formed by the ring-like shape, the open grooves positioned around a circumference of the connecting ring for receiving respective wire ends of respective stator coils inserted into the open grooves for forming an electrical connection between the respective wire ends and the connecting ring at respective terminal sections.

16. The apparatus as recited in claim 15, wherein:
a distal end of the respective wire end extends beyond a topside of the at least one connecting ring when the respective wire end is inserted into the open groove; and
the respective wire end is secured to the respective terminal section by at least one of welding, soldering, brazing, or crimping the distal end of the respective wire end.

17. The apparatus as recited in claim 15, wherein:
the connecting ring has a rectangular cross section, with an inner sidewall and an outer sidewall; and
the open groove is formed in one of the inner sidewall or the outer sidewall of the at least one connecting ring.

18. The apparatus as recited in claim 15, further comprising a mounting ring supporting the at least one connecting ring, wherein the mounting ring is constructed of a non-conductive material.

19. The apparatus as recited in claim 18, wherein the mounting ring includes a respective opening aligned with each respective open groove for receiving the respective wire end inserted into the respective open groove.

20. The apparatus as recited in claim 15, wherein there are a plurality of the connecting rings supported in the mounting ring, including at least one connecting ring connected to a multiple-phase power connection and a neutral connecting ring connected to a common reference,
the apparatus further comprising an insulating cover applied over the plurality of connecting rings, the insulating cover including a least one partition extending between two of the connecting rings for providing insulation between the two connecting rings.

* * * * *